(12) United States Patent
Heo

(10) Patent No.: US 12,093,309 B2
(45) Date of Patent: Sep. 17, 2024

(54) DISPLAY DEVICE

(71) Applicant: LG ELECTRONICS INC., Seoul (KR)

(72) Inventor: Seunghyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 17/597,162

(22) PCT Filed: Jun. 28, 2019

(86) PCT No.: PCT/KR2019/007876
§ 371 (c)(1),
(2) Date: Dec. 28, 2021

(87) PCT Pub. No.: WO2020/262742
PCT Pub. Date: Dec. 30, 2020

(65) Prior Publication Data
US 2022/0309095 A1    Sep. 29, 2022

(51) Int. Cl.
*G06F 16/58* (2019.01)
*G06F 16/532* (2019.01)
*G06F 16/535* (2019.01)
*G06F 16/583* (2019.01)
*G06F 16/955* (2019.01)

(52) U.S. Cl.
CPC ........ *G06F 16/5846* (2019.01); *G06F 16/532* (2019.01); *G06F 16/535* (2019.01); *G06F 16/9558* (2019.01)

(58) Field of Classification Search
CPC ............. G06F 16/5846; G06F 16/9558; G06F 16/535; G06F 16/532
See application file for complete search history.

(56) References Cited

U.S. PATENT DOCUMENTS 6,980,641 B1 * 12/2005 Stanford ................. H04M 3/42
379/355.06
8,745,683 B1    6/2014 Maeng
(Continued)

FOREIGN PATENT DOCUMENTS

JP    2015052971    3/2015
KR   1020090052809  5/2009
(Continued)

OTHER PUBLICATIONS

PCT International Application No. PCT/KR2019/007876, International Search Report dated Mar. 27, 2020, 4 pages.
(Continued)

*Primary Examiner* — Baoquoc N To
(74) *Attorney, Agent, or Firm* — LEE, HONG, DEGERMAN, KANG & WAIMEY

(57) ABSTRACT

The present invention relates to a display device which directly executes searching related to text displayed on a screen, the display device comprising: a display unit for displaying content; a user input interface unit for receiving a control signal of a pointer being displayed on the content; and a control unit for, when a search command is received, controlling the display unit to display a search result of the text displayed on an area where the pointer is located.

11 Claims, 15 Drawing Sheets

(56) References Cited

U.S. PATENT DOCUMENTS

| | | | |
|---|---|---|---|
| 2007/0027652 A1* | 2/2007 | Hosagrahara | G06Q 10/04 |
| | | | 702/182 |
| 2009/0070698 A1* | 3/2009 | Shurtleff | G06Q 10/06 |
| | | | 345/467 |
| 2009/0112848 A1 | 4/2009 | Kunjithapatham et al. | |
| 2011/0009957 A1* | 1/2011 | Langberg | A61F 2/2466 |
| | | | 623/2.37 |
| 2011/0099574 A1* | 4/2011 | Haeuser | H04N 21/64322 |
| | | | 725/112 |
| 2012/0054168 A1 | 3/2012 | Chung et al. | |
| 2013/0182182 A1 | 7/2013 | Mountain | |
| 2013/0246110 A1* | 9/2013 | Nakhayi Ashtiani | |
| | | | G06Q 30/0207 |
| | | | 705/7.13 |
| 2013/0329109 A1* | 12/2013 | Park | H04N 21/440263 |
| | | | 348/333.01 |
| 2014/0118239 A1* | 5/2014 | Phillips | G06F 3/1454 |
| | | | 345/156 |
| 2015/0212659 A1* | 7/2015 | Roberts | G06F 3/0482 |
| | | | 715/747 |
| 2016/0358632 A1* | 12/2016 | Lakhani | H04N 9/802 |
| 2019/0050856 A1* | 2/2019 | Vintila | G06F 16/27 |
| 2019/0279234 A1* | 9/2019 | Bagley | G06Q 10/06315 |

FOREIGN PATENT DOCUMENTS

| | | |
|---|---|---|
| KR | 1020150136312 | 12/2015 |
| KR | 1020160061176 | 5/2016 |

OTHER PUBLICATIONS

European Patent Office Application Serial No. 19934643.8, Search Report dated Dec. 21, 2022, 9 pages.

\* cited by examiner

DISPLAY DEVICE

CROSS-REFERENCE TO RELATED APPLICATIONS

This application is the National Stage filing under 35 U.S.C. 371 of International Application No. PCT/KR2019/007876, filed on Jun. 28, 2019, the contents of which is hereby incorporated by reference herein in its entirety.

TECHNICAL FIELD

The present disclosure relates to a display device. More particularly, the present disclosure relates to a display device capable of directly searching for a text displayed on a screen.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In particular, conventionally, when a user wants to search for something, the user should execute a search function and input a text to be found to receive a search result. In addition, the user should inconveniently select a specific content provider (CP) or a specific function from whole search results, even when the user wants to obtain only a search result for the specific CD or the specific function.

Accordingly, the user needs a manner for directly searching for a text displayed on a digital TV while using the digital TV, or for performing a search operation only with respect to a specific range.

DISCLOSURE

Technical Problem

The present disclosure is to provide a display device capable of directly searching for a specific text displayed on a screen.

The present disclosure is to provide a display device capable of more exactly recognizing a text that a user wants to search for, when searching for a specific text displayed on a screen.

The present disclosure is to provide a display device capable of more exactly acquiring a search target, when searching for a specific text displayed on a screen.

The present disclosure is to provide a display device capable of minimizing an inconvenience of a user when the user inputs a text, and enabling the user to more conveniently set a search range.

Technical Solution

A display device according to an embodiment of present disclosure comprises a display configured to display content, a user input interface configured to receive a control signal of a pointer displayed on the content, and a controller configured to control the display to display a search result of a text displayed in an area in which the pointer is positioned, when receiving a search command.

The controller is configured to extract the text from the area in which the pointer is positioned, when receiving the search command, and perform a search operation using the extracted text.

The controller is configured to perform a search operation using a text which has a hyperlink in the area in which the pointer is positioned, when receiving the search command.

The controller is configured to, when the content is a web-browser: acquire the text, which is in the area in which the pointer is positioned, as a search target, when the text, which is in the area in which the pointer is positioned has a hyperlink, and control the display to display a search impossibility message, when the text, which is in the area in which the pointer is positioned, has no hyperlink.

The controller is configured to acquire whether to perform a search operation using the text, based on a position of the text on the content, when receiving the search command.

The controller is configured to acquire, as a search target, a text extracted from a title area of a banner, when receiving the search command through a pointer positioned in the title area of the banner, when the content is the banner.

The controller is configured to acquire whether to perform a search operation using the text in the area in which the pointer is positioned, based on the size of the text, when receiving the search command.

The controller is configured to, when the content is a minoring image: receive, from an external terminal, a text in an area in which the pointer is positioned in the mirroring image, and perform a search operation using the text received from the external terminal.

The controller is configured to, when the area, in which the pointer is positioned, is an image: extract a text related to the image, and perform a search operation using the extracted text.

The controller is configured to, when a fixed text and a variable, text is included the area in which the pointer is positioned: perform a search operation using the fixed text.

The controller is configured to further receive a command for selecting a search range of the text, and perform a search operation using the text within the search range.

The controller is configured to display at least one search area icon around the pointer, and acquire, as the search range, a search area corresponding to a search area icon which is selected.

The controller is configured to recognize a command for selecting one area, which is on the content, through the pointer, as a command for executing the selected area, when receiving the command for selecting the one area within a specific time, and recognize the command for selecting the one area, which is on the content, through the pointer, as a search command for searching for the selected area, when receiving the command for selecting the one area after a specific time or more.

The controller is configured to display at least one search area icon, when recognizing the search command, and search for the text displayed in the area in which the pointer is positioned, within a search range corresponding to the search area icon, when receiving a command for selecting the search area icon.

The display device further comprising a voice acquisition module to acquire the search command, wherein the controller is configured to acquire, as a search target, the text in the area in which the pointer is positioned, when receiving the search command through the voice acquisition module.

Advantageous Effects

According to an embodiment of the present disclosure, since a user does not need to individually input a search word, the inconvenience of the user may be minimized when a search function is performed.

In addition, since the search result is provided by merely selecting the text displayed on the screen, the time taken to perform a search operation may be more minimized, as compared to the case that a search word is input after the conventional search function is executed.

In addition, when the text displayed on the screen is acquired as the search word, the text is received from the relevant application, instead of analyzing an image in the screen. Accordingly, the precision in recognizing the text to be found by the user may be enhanced. Accordingly, the precision in providing the search result may be increased.

In addition, the search operation is not performed with respect to a meaningless text of texts displayed on the screen. Accordingly, the search target may be more exactly acquired.

In addition, the search range is directly set when the search operation is requested. Accordingly, the result desired by the user may be more rapidly and exactly provided.

MODE FOR INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
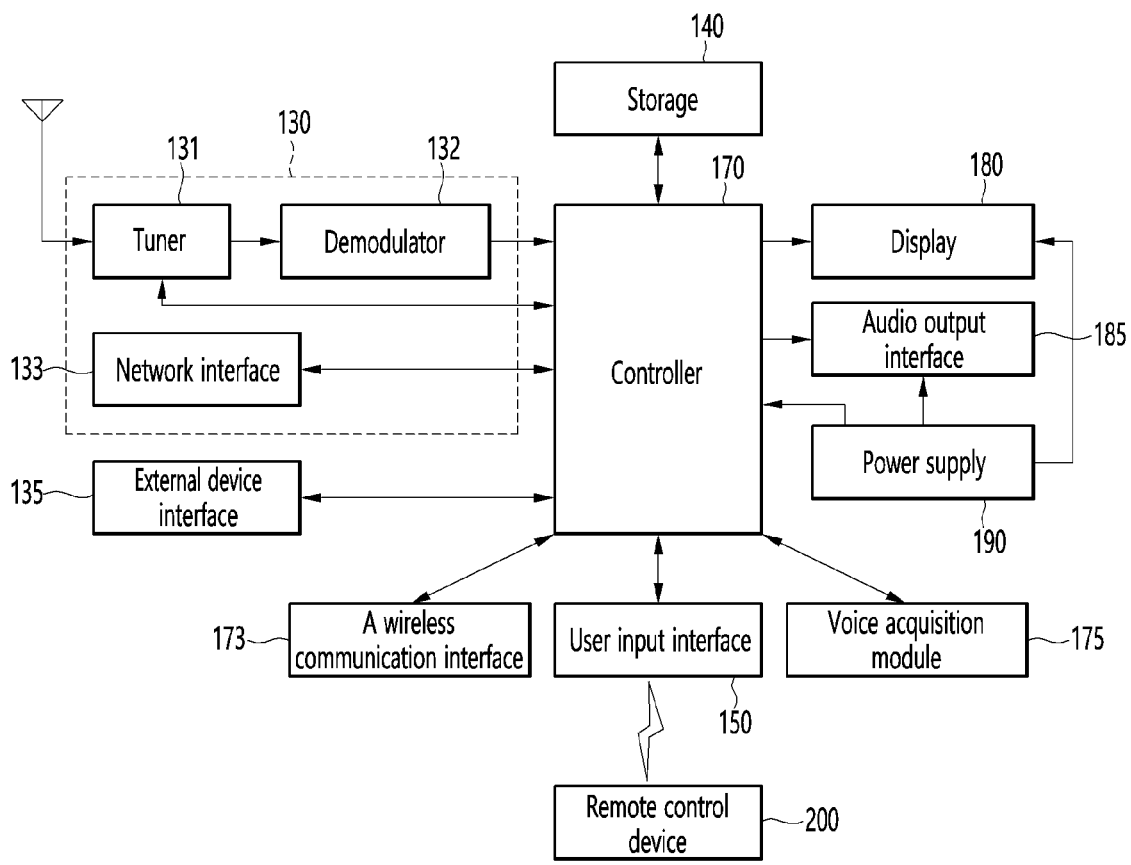
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA) Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting n AC power source into a DC power source, and a DC/DC converter for converting a level of the DC source power.

Figure 2:
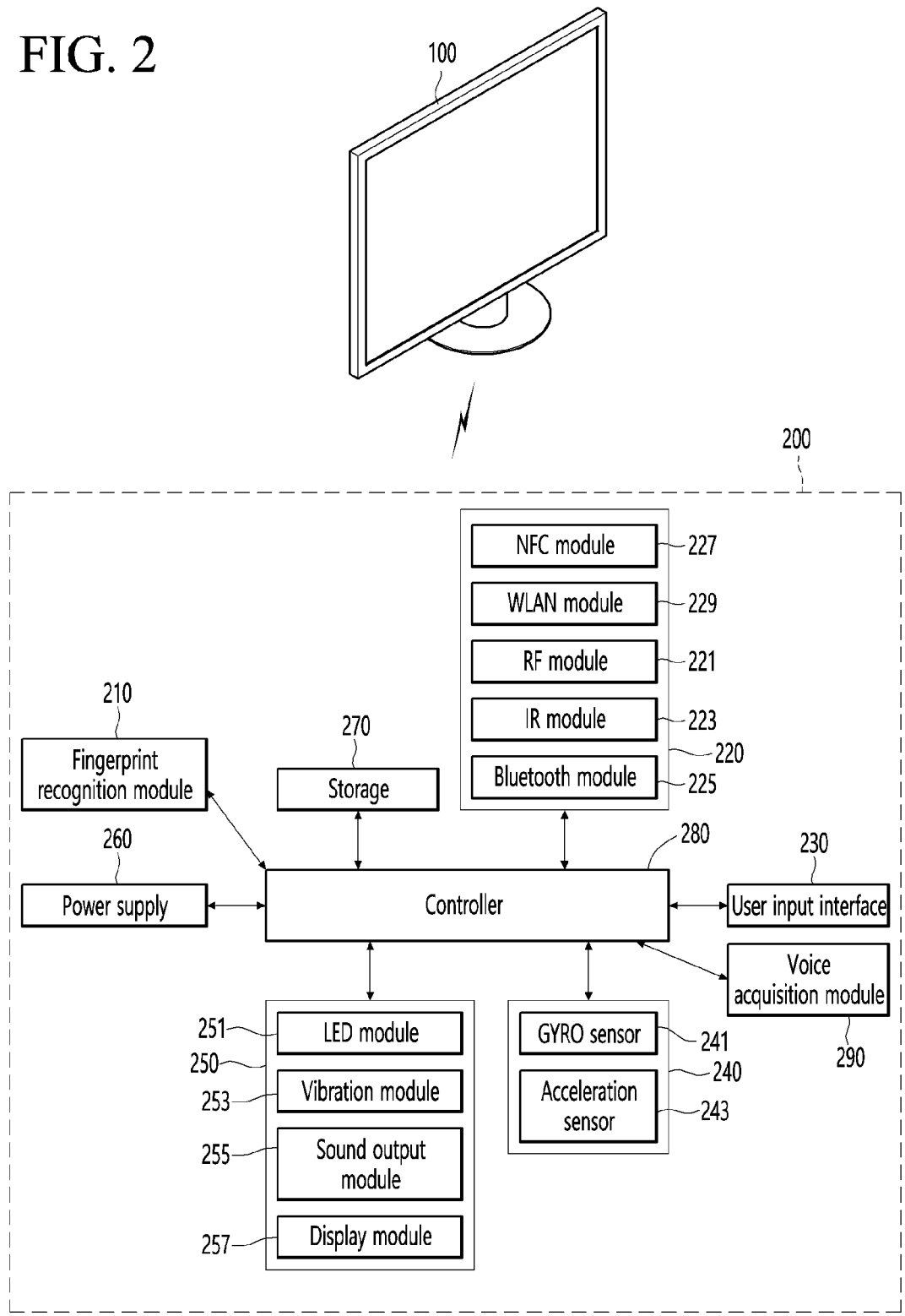
FIG. 2 is a block diagram illustrating a remote control device according to an embodiment of the present disclosure.
Figure 3:
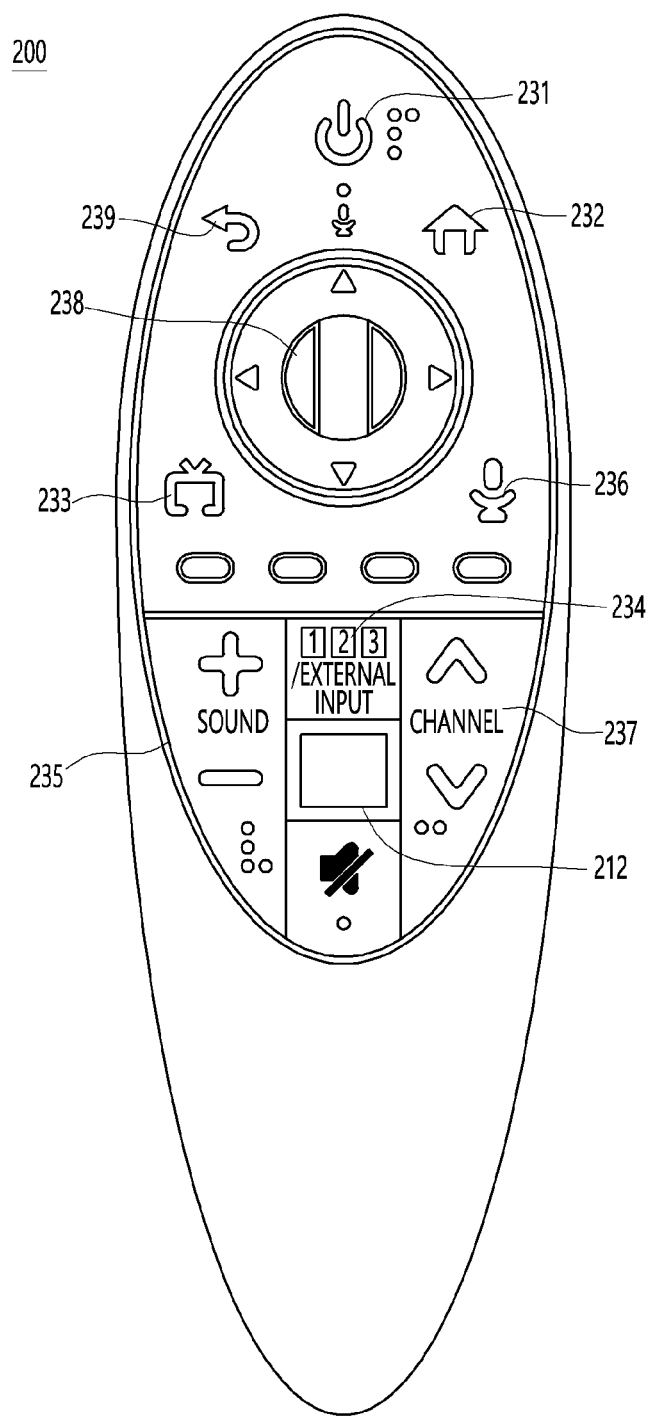
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212. can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RE module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
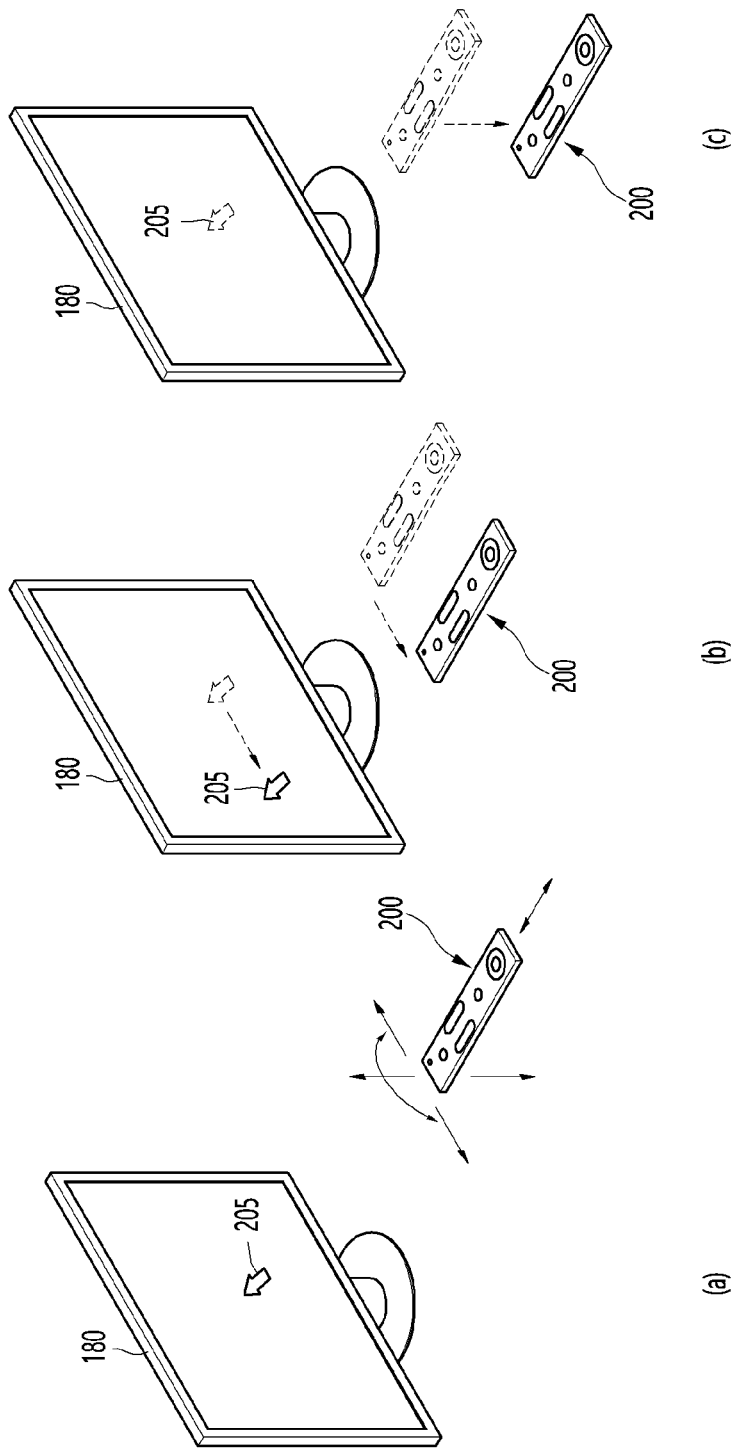
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
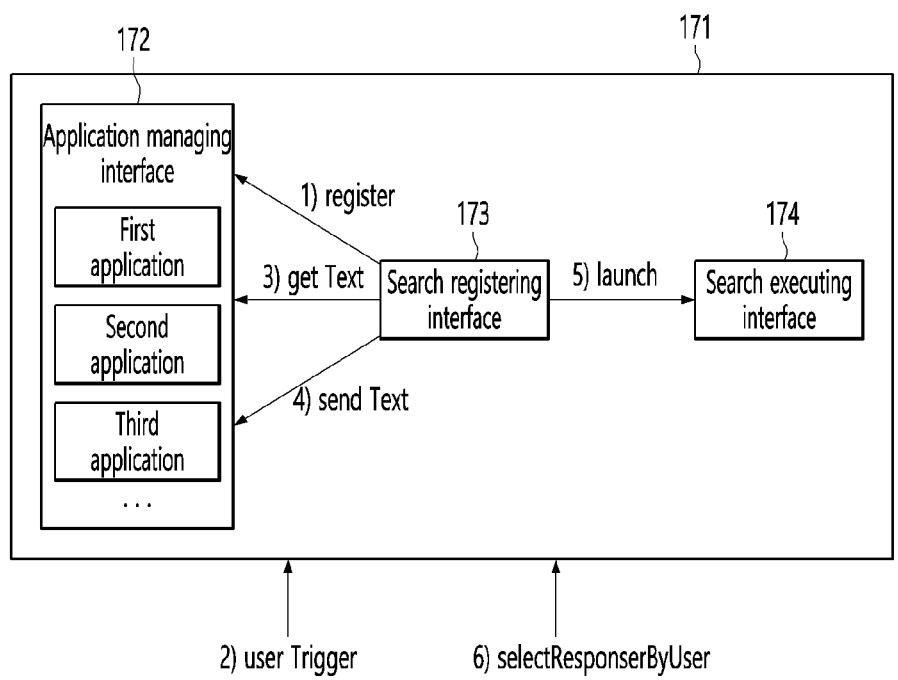
FIG. 5 is a block diagram of a search module included in a display device according to an embodiment of the present disclosure.

FIG. 5 is a block diagram of a search module included in a display device according to an embodiment of the present disclosure.

The display device 100 according to an embodiment of the present disclosure may further include a search module 171 to directly search for a text displayed on the display 180.

The search module 171 may be included in the controller 170. In other words, the search module 171, which is one component of the controller 170, may operate to search for a specific text displayed on the display 180.

The search module 171 may include all or at least some of an application managing interface 172, a search registering interface 173, and a search executing interface 174.

The application managing interface 172 may execute, operate, and manage an application installed in the display device 100.

Referring to an example of FIG. 5, a first application, a second application, and a third application are installed in the display device 100, and the application managing interface 172 may execute, operate, and manage each of the application, the second application, and the third application The first application may be a native app. For example, the first application may include an app for a browser, an app for settings, or an app for a moving picture service.

The second application may be a web app. The second application may include a Webkit framework-based application. For example, the second application may include a store app, an internet app, and the like.

The third application may be a Qt app. The third application may include a Qt framework-based application. For example, the third application may include a banner app, a home app, a search app, and the like.

The application managing interface 172 may transmit/receive data to and from the search registering interface 173. The application managing interface 172 may directly transmit/receive a signal to/from the search registering interface 173, when transmitting/receiving data related to the first application.

When transmitting and receiving data related to the second application, the application managing interface 172 may transmit/receive a signal to/from the search registering interface 173 through the WebKit. The application managing interface 172 may transmit/receive a signal to/from the search registering interface 173 through the Qt framework, when transmitting/receiving data related to the third application.

When a specific application is executed, the application managing interface 172 may register the executed application in the search registering interface 173 (1) register). The search module 171 may receive a trigger of a user requesting for the search, while the specific application is executed ((2) user trigger). In this case, the search registering interface 173 may request a text, which is user-triggered, from the application managing interface 172 (3) get text), and the application managing interface 172 may send a text, which is requested by the search registering interface 173, (4) send text). The search registering interface 173 may send the text to the search executing interface 174, and may search for the text received by the search executing interface 174, when a search operation is launched (5) launch). Meanwhile, the search module 171 may receive a user selection for setting a search range (6) selectResonserByUser). In this case, the search module 171 may set the search range such that only a specific application responses to the search.

The display 180 may display a text search result from the search executing interface 174.

Meanwhile, the search module illustrated in FIG. 5 is provided only for the illustrative purpose. In other words, the components, the operating sequence, and the operating method illustrated in FIG. 5 may be changed.

In addition, when the display device 100 is minor-connected to an external terminal, such as a smart phone, the display device 100 further includes a screen gateway (not illustrated) for receiving a text from the external terminal. In other words, when the display 180 is displaying a mirroring image, the search module 171 may perform a registering operation, a text requesting operation, and a text receiving operation, together with the external terminal through the screen gateway (not illustrated).

Figure 6:
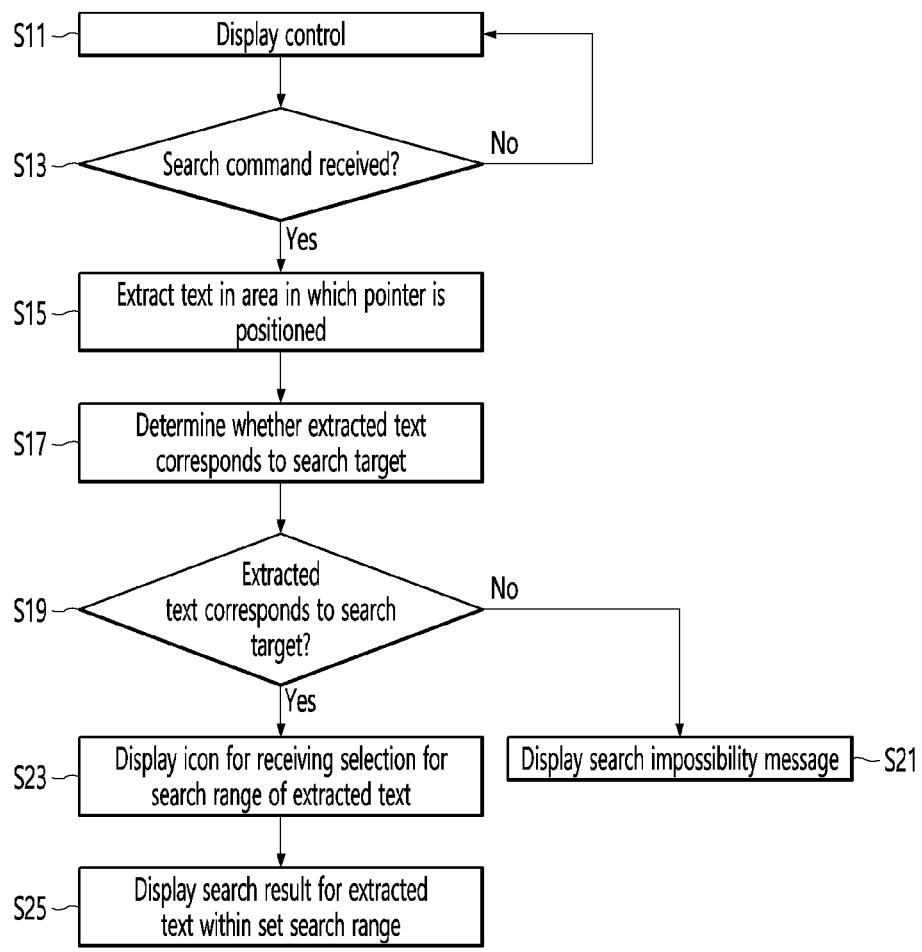
FIG. 6 is a flowchart illustrating the operating method of a display device according to an embodiment of the present disclosure.

FIG. 6 is a flowchart illustrating the operating method of a display device according to an embodiment of the present disclosure.

The display 180 may display content (S11).

The content may refer to information provided by executing an application or executing a mirroring function. For example, the content may include information resulting from the execution of the browser application, information resulting from the execution of a moving picture service application, information resulting from the execution of a banner application, information resulting from the execution of a home application, and information resulting from the execution of a setting application.

According to an embodiment, the display 180 may display the content e entire surface of the screen.

According to another embodiment, the display 180 may display the content) a specific area of a broadcasting image.

The controller 170 may acquire whether to receive a search command (S13).

The controller 170 may determine whether the search command is received, in the state that the content is being displayed.

The controller 170 may receive the search command through a pointer 205 or may receive the search command through the voice acquisition module 175.

The search command may be a command for acquiring information on a specific text in the content.

Hereinafter, the method for receiving the search command based on the pointer 205 will be described. The controller 170 may display the pointer 205 on the content, and may receive the search command through a signal for selecting the specific text in the content based on the pointer 205.

In detail, the controller 170 may receive a control signal of the pointer 205 from the remote control device 200 through the user input interface 150. In other words, the user input interface 150 may receive the control signal of the pointer 205 displayed on the content, from the remote control device 200.

The control signal of the pointer 205 may include a signal for moving the position of the pointer 205 and a signal for selecting one area through the pointer 205.

For example, when receiving a command for selecting one area on the content through the pointer 205 within a specific time, the controller 170 may recognize the command as a command for executing the selected area. When receiving a command (long-press command) for selecting the one area on the content through the pointer 205 after a specific time or more, the controller 170 may recognize the command as a command for searching for a text in the selected area.

Hereinafter, a method for receiving a search command through the voice acquisition module 175 will be described. The controller 170 may receive the search command by recognizing the voice of a user through a microphone provided in the voice acquisition module 175. When receiving the search command through the voice acquisition module 175, the controller 170 may recognize a text, which serves as a search target, as a text displayed on an area in which the pointer 205 is positioned. The details thereof will be described later with reference to FIG. 14.

The controller 170 may consecutively display content, and may acquire whether the search command is received, when the search command is not received.

The controller 170 may control the display 180 to display the search result of the text displayed on the area in which the pointer 205 is positioned, when receiving the search command, and the details thereof will be described subsequently.

The controller 170 may extract the text displayed on the area in which the pointer 205 is positioned, when receiving the search command (S15).

The controller 170 may extract the text displayed on the area in which the pointer 205 is positioned, at the time point at which the search command is received, when receiving the search command.

In detail, the search registering interface 173 may transmit, to the application managing interface 172, a signal for requesting for the text in the area in which the pointer 205 is positioned, and may receive a text signal responding to the signal for requesting for the text, from the application managing interface 172, thereby acquiring the text in the area in which the pointer 205 is positioned.

As described above, when the text is acquired through the application managing interface 172, the probability in which the text is erroneously recognized may be reduced, as compared to that the text is extracted by analyzing an image on which content is displayed. Accordingly, the precision in providing the search result may be enhanced.

According to an embodiment, the controller 170 may extract a text by analyzing the image on which the content is displayed, thereby recognizing a text displayed on the area in which the pointer 205 is positioned.

Meanwhile, when the pointer 205 is positioned in an image, such as a thumbnail, at the time point at which the search command is received, the controller 170 may extract the text related to an image. For example, the controller 170 may extract the text related to the image from meta-data on the image of an area in which the pointer 205 is positioned. In this case, the text related to the image may include information on a title, a person, a time, or an episode number.

The controller 170 may acquire whether the extracted text corresponds to a search target (S17).

The controller 170 may determine whether the extracted text corresponds to the search target.

The search target may refer to a text to be found through a search operation.

In detail, the content may include various pieces of information. Among them, some information may meaningful information that a user is curious about or needs, and other information may be meaningless information.

For example, the meaningless information may be information used to decorate an execution image of content, information for additional explanation, or variable information. The meaningless information may have no result information to be displayed even though a search operation is performed. Accordingly, it is unnecessary to search for the information. In other words, the meaningless information may be a text that is not a target for the search operation. Accordingly, the controller 170 may determine whether the extracted text corresponds to a search target.

According to the first embodiment, the controller 170 may determine whether a text extracted through a hyperlink corresponds to the search target. For example, the controller 170 may acquire the extracted text as the search target, when the extracted text has the hyperlink. In this case, the hyperlink may refer to a function of linking to another component. The controller 170 may does not determine whether the extracted text corresponds to the search target, when the extracted text has no hyperlink.

According to a second embodiment, the controller 170 may determine whether the extracted text corresponds to the search target, based on a position of the extracted text in content. For example, the controller 170 may determine the extracted text as the search target, when the extracted text is positioned in a title area of the content.

According to a third embodiment, the controller 170 may determine whether the extracted text corresponds to the search target, based on the size of the extracted text. For example, the controller 170 may determine the extracted text as the search target, when the size of the extracted text is greater than the size of other texts on the content.

According to a fourth embodiment, the controller 170 may acquire, as the search target, a text extracted from a mirroring-connected external terminal.

According to a fifth embodiment, the controller 170 may acquire, as the search target, a text extracted in relation to an image, when the search command for the image is received.

According to a sixth embodiment, the controller 170 may acquire a fixed text as the search target, when the extracted text includes the fixed target and a variable target.

The controller 170 may determine whether the extracted text corresponds to the search target according to one of the first to sixth embodiments. In addition, the controller 170 may determine whether the extracted text corresponds to the search target, according to some of the first to sixth embodiments.

In addition, the controller 170 may set at one of methods according to the first to sixth embodiments to a reference method for determining whether the extracted text corresponds to the search target, based on the type of an application to provide content or the state of the extracted text, and may perform the set reference method to determine whether the extracted text corresponds to the search target. For example, the controller 170 may acquire the search target by determining whether the text in the area, in which the pointer 205 is positioned, has a hyperlink, when the content is a web-browser and when a search command is issued on one area on the content. For example, the controller 170 rimy acquire the state of the search target depending on the position of the text, which is in the area for the pointer 205, on a banner, when the content is the banner and when a search command is issued on one area on the content. However, this is provided for the illustrative purpose, and the present disclosure is not limited thereto.

In addition, the controller 170 may determine whether the extracted text corresponds to the search target, through another method in addition to methods according to the first to sixth embodiments.

Meanwhile, the controller 170 may omit the step of determining whether the extracted text corresponds to the search target. In other words, according to another embodiment of the present disclosure, when a text is extracted, the controller 170 may directly perform the search operation for the extracted text. In this case, the controller 170 may directly display one or more search area icons 61 to 63 (see FIG. 7), when the search command is recognized. When receiving a selection command for a search area icon, the controller 170 may search for the text displayed on the area, in which the pointer 205 is positioned, within a search range corresponding to the search area icon.

The controller 170 may express a search impossibility message that may not be found, when the extracted text does not correspond to the search target (S21).

In other words, the controller 170 may perform the search operation, when the extracted text does not correspond to the search target. In addition, the controller 170 may control the display 180 to display the search impossibility message, instead of performing the search operation.

As described above, when the search result is not displayed even though the user requests for the search, the user may erroneously recognize the display device 100 as being faulted. Accordingly, when the search operation is not performed, the controller 170 may display the search impossibility message to inform the user of that the search is not performed, thereby minimizing the erroneous recognition of the user. Accordingly, the reliability of the product may be enhanced.

Meanwhile, when the extracted text corresponds to the search target, the controller 170 may display an icon for receiving the selection for the search range of the extracted text (S23).

The controller 170 may receive a command for setting the search range before performing the search operation, thereby setting the search range of the text. In this case, the controller 170 may search for the text within the set search range.

According to an embodiment, the step for receiving the selection for the search range may be omitted. In other words, according to an embodiment, the controller 170 may perform the search operation for the text with respect to the entire inner portion of the display device 100, when the extracted text corresponds to the search target. According to another embodiment, the controller 170 may perform the search operation for the extracted text only with respect to the set search range.

The following description will be made on the assumption that the controller 170 performs the step of setting the search range by displaying the icon for receiving the selection for the search range, and the details thereof will be described below with reference to FIGS. 7 to 8.

The controller 170 may display a search result for the extracted text within the set search range (S25).

In other words, when receiving a search command for a text in content, the controller 170 may perform the search for the text and directly display the search result on the display 180.

Hereinafter, a method in which the display device 100 receives the search command and displays the search result according to an embodiment of the present disclosure will be described by making reference to various examples in FIGS. 7 to 13.

Figure 7:
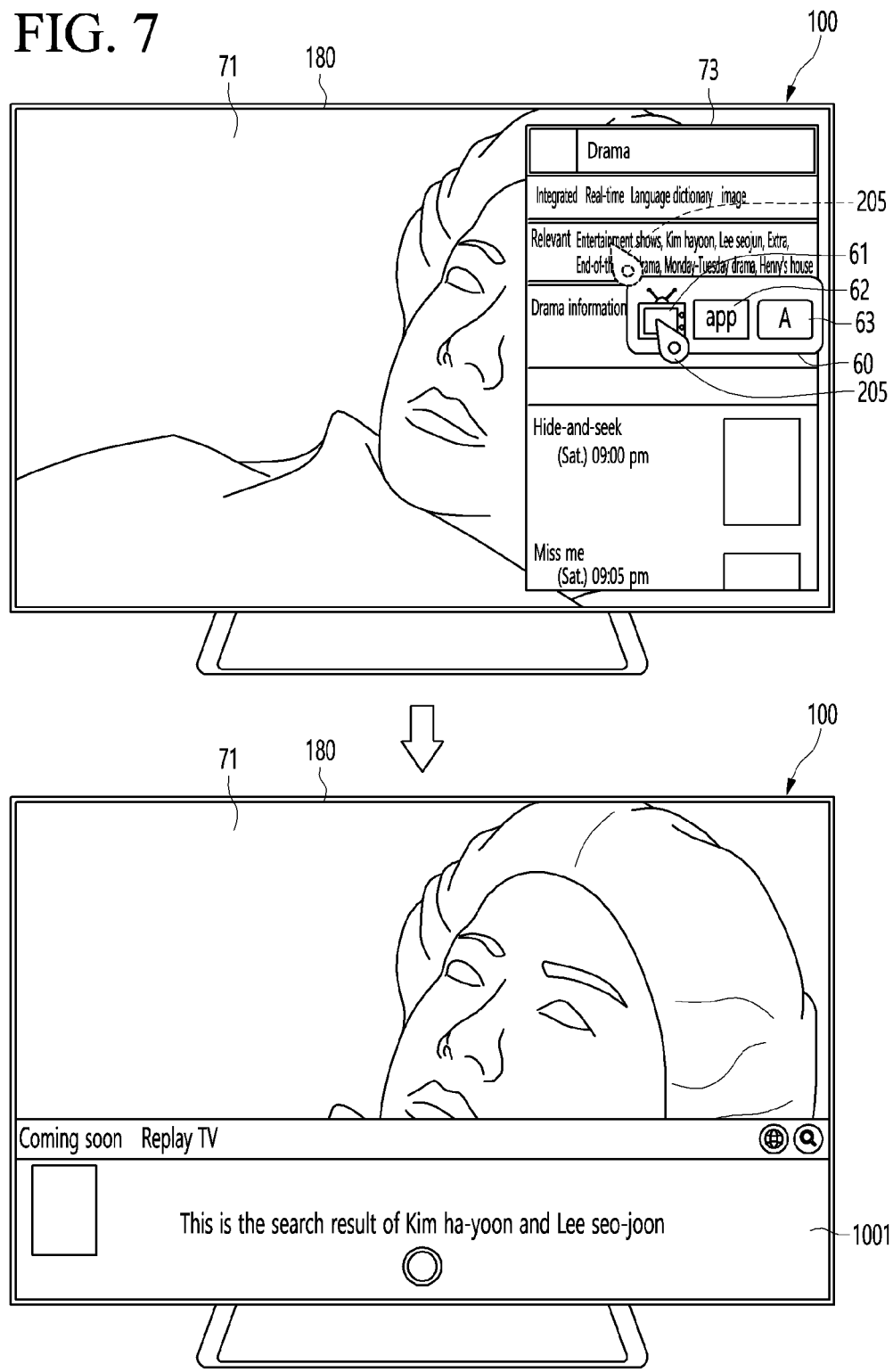
FIGS. 7 to 9 are views illustrating a method in which a display device receives a search command for a text in content and displays a search result according to a first embodiment of the present disclosure.
Figure 8:
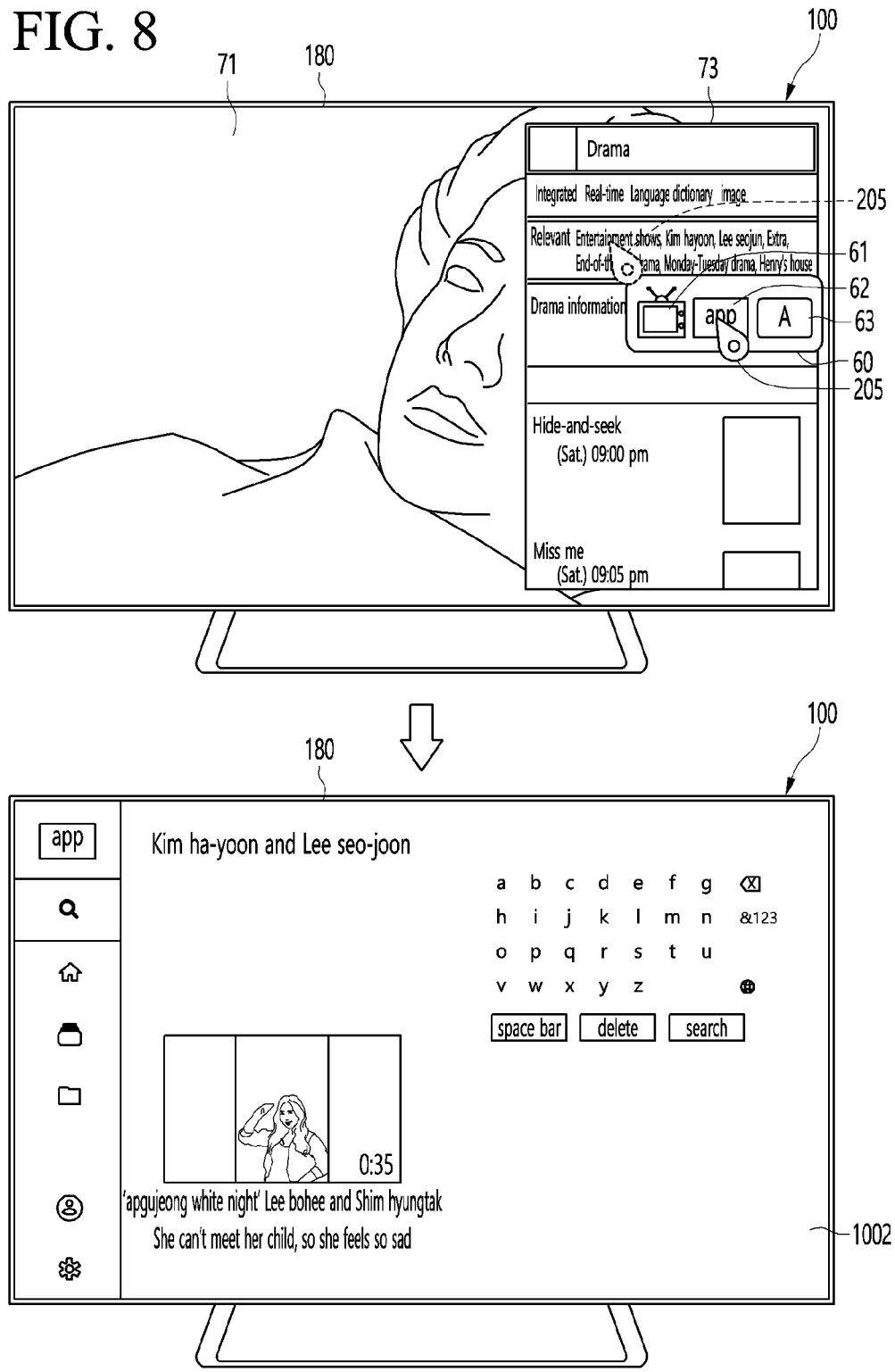
Figure 9:
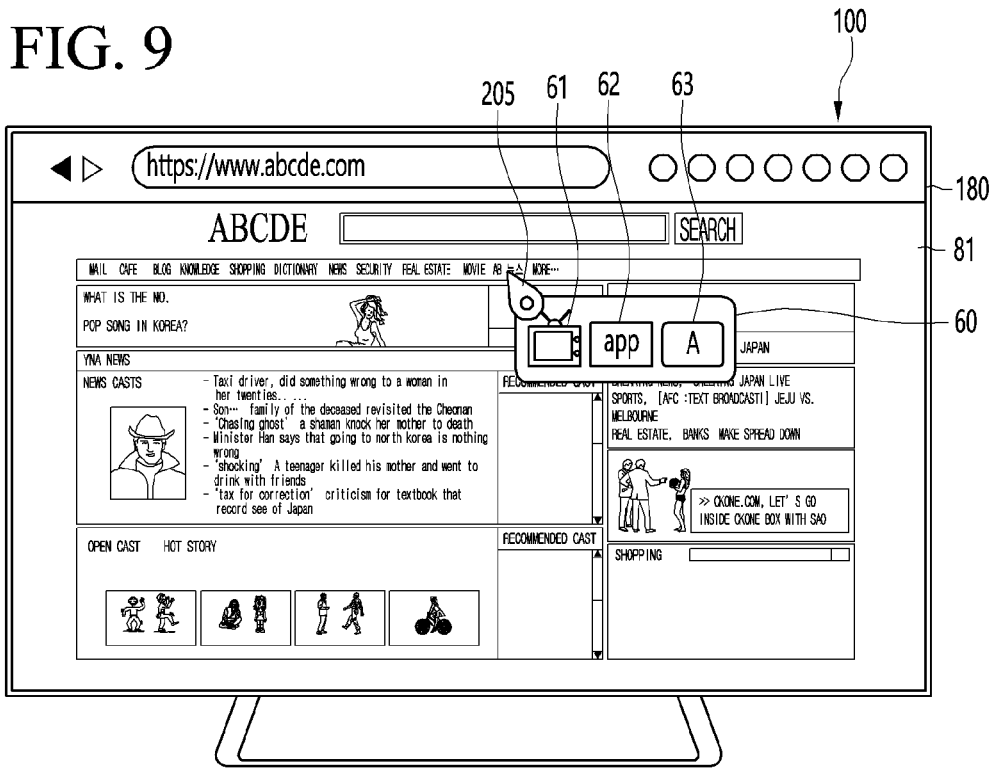

FIGS. 7 to 9 are views illustrating a method in which a display device receives a search command for a text in content and displays a search result according to a first embodiment of the present disclosure.

The display 180 may display content 73, and the content 73 may be displayed while overlapping a specific area of a broadcasting image 71.

As illustrated in FIG. 7, the content 73 may be a web-browser, as a web-browser application is executed, but the present disclosure is not limited thereto. In other words, the content 73 may be information displayed as another application is executed instead of the web-browser application.

The controller 170 may receive the search command for one area of the content 73 through the pointer 205. In this case, the text displayed on the area in which the pointer 205 is positioned may be extracted.

For example, the controller 170 may extract 'Kim Ha-yoon' and 'Lee Seo-joon' as the text displayed on the area in which the pointer 205 is positioned.

In addition, the controller 170 may perform a search operation by using a text having a hyperlink in an area in which the pointer 205 is positioned, when the search command is received. For example, the controller 170 may acquire only a text, which has a hyperlink, from among texts extracted from the area in which the pointer 205 is positioned, when the search command is received.

The controller 170 may acquire, as a search target, the text displayed on the area in which the pointer 205 is positioned, when the text in the area in which the pointer 205 is positioned has a hyperlink. However, the controller 170 may acquire, as a non-search target, the text displayed on the area in which the pointer 205 is positioned, when the text in the area in which the pointer 205 is positioned has no hyperlink.

The controller 170 may further receive a command for selecting the search range, when the text in the area in which the pointer 205 is positioned is acquired as the search target. In other words, the controller 170 may further receive the command for selecting the search range (for example, a first search area icon 61) through the pointer 205, after receiving the search command for selecting one area (for example, 'Kim Ha-yoon' and 'Lee Seo-joon') through the pointer 205.

In detail, the controller 170 may control the display 180 to further display a search range selection menu 60 around the pointer 205, when the search target is acquired. The search range selection menu 60 may include one or more search area icons 61 to 63.

The search area icons 61 to 63 may represent areas for searching. For example, the first search area icon 61 may indicate an inner part of a TV, the second search area icon 62 may indicate a moving picture service application, and the third search area icon 63 may indicate the Internet.

The controller 170 may acquire, as the search range, the search area corresponding to the selected search area icon.

As illustrated in FIG. 7, the controller 170 may set, as the search range, a search area, for example, the inner part of the TV, indicated by the first search area icon 61, when receiving the select command for the first search area icon 61. In this case, the controller 170 may search for 'Kim Ha-yoon' and 'Lee Seo-joon', which is a search target, in the inner part of the TV, and may control the display 180 to display information 1001 on the result from the searching.

Meanwhile, FIG. 8 illustrates the case that the controller 170 further includes a command for selecting the second search area icon 62 as the search range through the pointer 205, after receiving the search command for selecting one area (for example, 'Kim Ha-yoon' and 'Lee Seo-joon') through the pointer 205.

As illustrated in FIG. 8, the controller 170 may set, as the search range, a search area (for example, the moving picture service application) indicated by the second search area icon 62, when receiving the selection command for the second search area icon 62. In this case, the controller 170 may control the display 180 to display information 1002 on the result from the searching form 'Kim Ha-goon' and 'Lee Seo-joon', which is a search target, in the moving service application.

In other words, when receiving a command for selecting the search range for the text through the search range selection menu 60, the controller 170 may perform a search operation using the text with respect to the selected search range.

Meanwhile, although FIGS. 7 to 8 illustrate the case that content 73 is displayed on an image 71, the present disclosure may be applied even to the case that content 81 is displayed on the entire portion of the screen of the display 180.

In other words, as illustrated in FIG. 9, even if the display 180 fully displays content 81 on the whole screen, when the controller 170 receives a search command for one area on the content 81, the controller 170 may extract a text displayed on the area in which the pointer 205 is positioned, and may acquire the search target, based on whether the extracted text includes the hyperlink. Similarly, the controller 170 may set a search range through the search range selection menu 60, after acquiring the search target, may perform a search operation, and may display a search result. The duplicated description of the description made with FIGS. 7 to 8.

Figure 10:
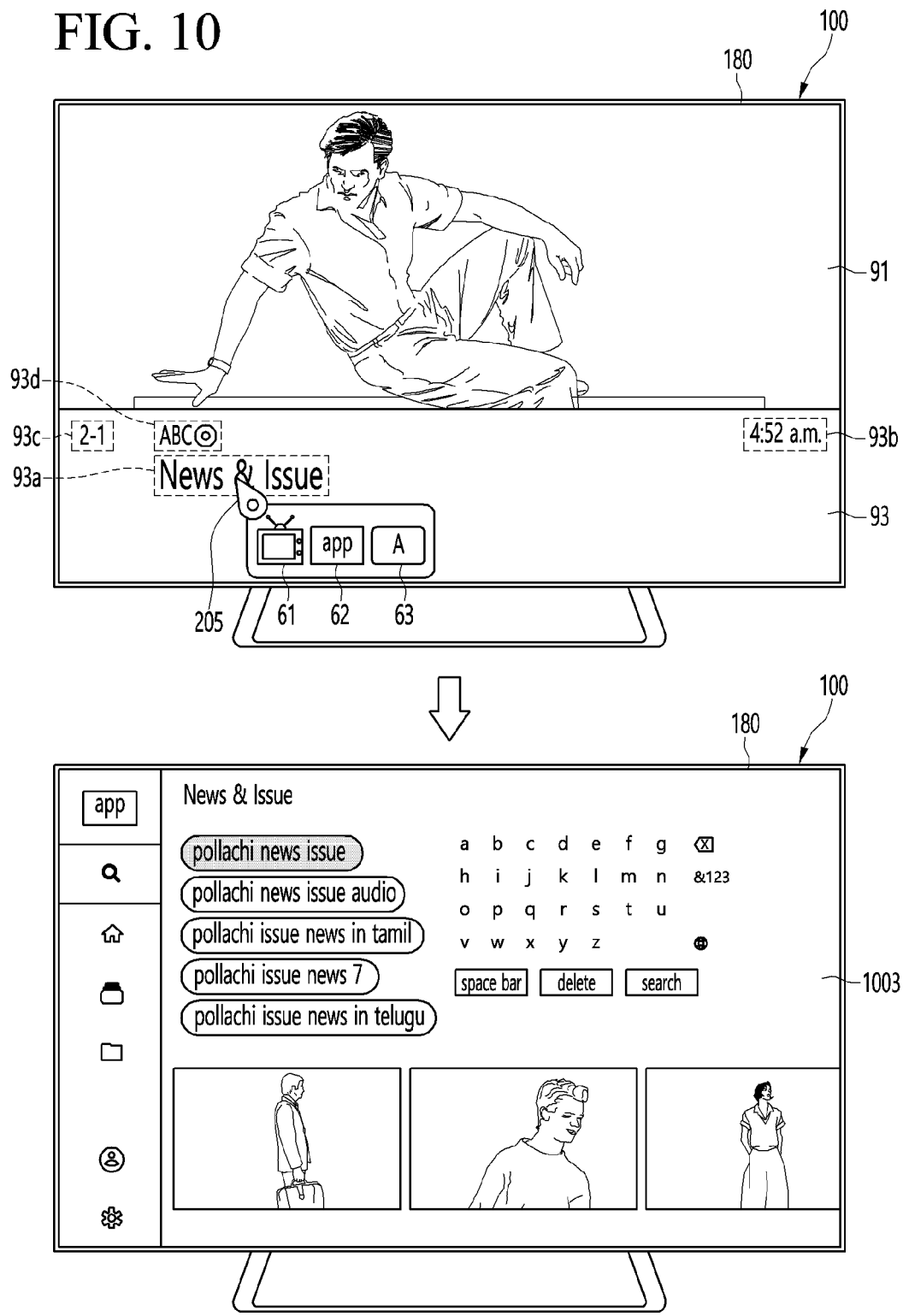
FIG. 10 is a view illustrating a method in which a display device receives a search command for a text in content and displays a search result according to a second embodiment and a third embodiment of the present disclosure.

FIG. 10 is a view illustrating a method in which a display device receives a search command for a text in content and displays a search result according to a second embodiment and a third embodiment of the present disclosure.

The display 180 may display content 93, and the content 93 may be displayed while overlapping a specific area of a broadcasting image 91.

As illustrated in FIG. 10, the content 93 may be a banner displayed, as a banner application is executed, but the present disclosure is not limited thereto. In other words, the content 93 may be information displayed, as another application is executed, instead of the banner application.

The controller 170 may receive the search command for one area of the content 93 through the pointer 205. In this case, the controller 170 may extract a text displayed on the area in which the pointer 205 is positioned.

For example, the controller 170 may extract a text of 'News & Issue' as that displayed on the area in which the pointer 205 is positioned.

In addition, according to a second embodiment of the present disclosure, the controller 170 may acquire, based on where the text in the area, in which the pointer 205 is positioned, is positioned on the content 93, the text as a search range. In other words, the controller 170 may acquire whether to perform a search operation using the text, based on a position of the text in the area in which the pointer 205 is positioned, on the content 93. For example, the content 93 including the banner may include a title area 93a, a time information area 93b, a channel information area 93c, or a broadcasting company information area 93d, and at least a portion among them may be a search target area. If the title area 93a is a search target area, when the controller 170 receives a search command through the pointer 205 positioned in the title area 93 of a banner, the controller 170 may acquire, as a search target, a text extracted from the title area 93a. Meanwhile, when the time information area 93b is not the search target area, the controller 170 may not acquire a text extracted from the time information area 93b as a search target, even if receiving a search command through the pointer 205 positioned in the time information area 93b.

Meanwhile, according to a third embodiment of the present disclosure, the controller 170 may acquire a text as a search target, based on the size of the text in the area in which the pointer 205 is positioned. In other words, the controller 170 may acquire whether to perform a search operation using a text, based on the size of the text extracted from the area in which the pointer 205 is positioned.

For example, referring to FIG. 10, the text in the area in which the pointer 205 is positioned may be larger than the size of a text displayed on another area. In detail, the size of the text in the title area 93a in which the pointer 205 is positioned may be larger than the size of a text in the time information area 93b, the size of a text in the channel information area 93c, or the size of the text in the broadcasting information area 93d. Accordingly, in this case, since the text in the title area 93a which is the area in which the pointer 205 is positioned, is larger than the text in the another area, the controller 170 may acquire the text in the title area 93a as a search target, when receiving the search command.

According to an embodiment, the controller 170 may acquire an area having the size of the text, which is larger than a reference size, as the target area. For example, the controller 170 may acquire, as search target areas, the title area 93a and the channel information area 93c having text sizes larger than the reference size, and may acquire, as non-search target areas, the time information area 93b and the broadcasting company information area 93d having text sizes less than the reference size. In this case, the controller 170 may acquire an extracted text as the search target, when extracting the text from the title area 93a or the channel information area 93c.

Figure 11:
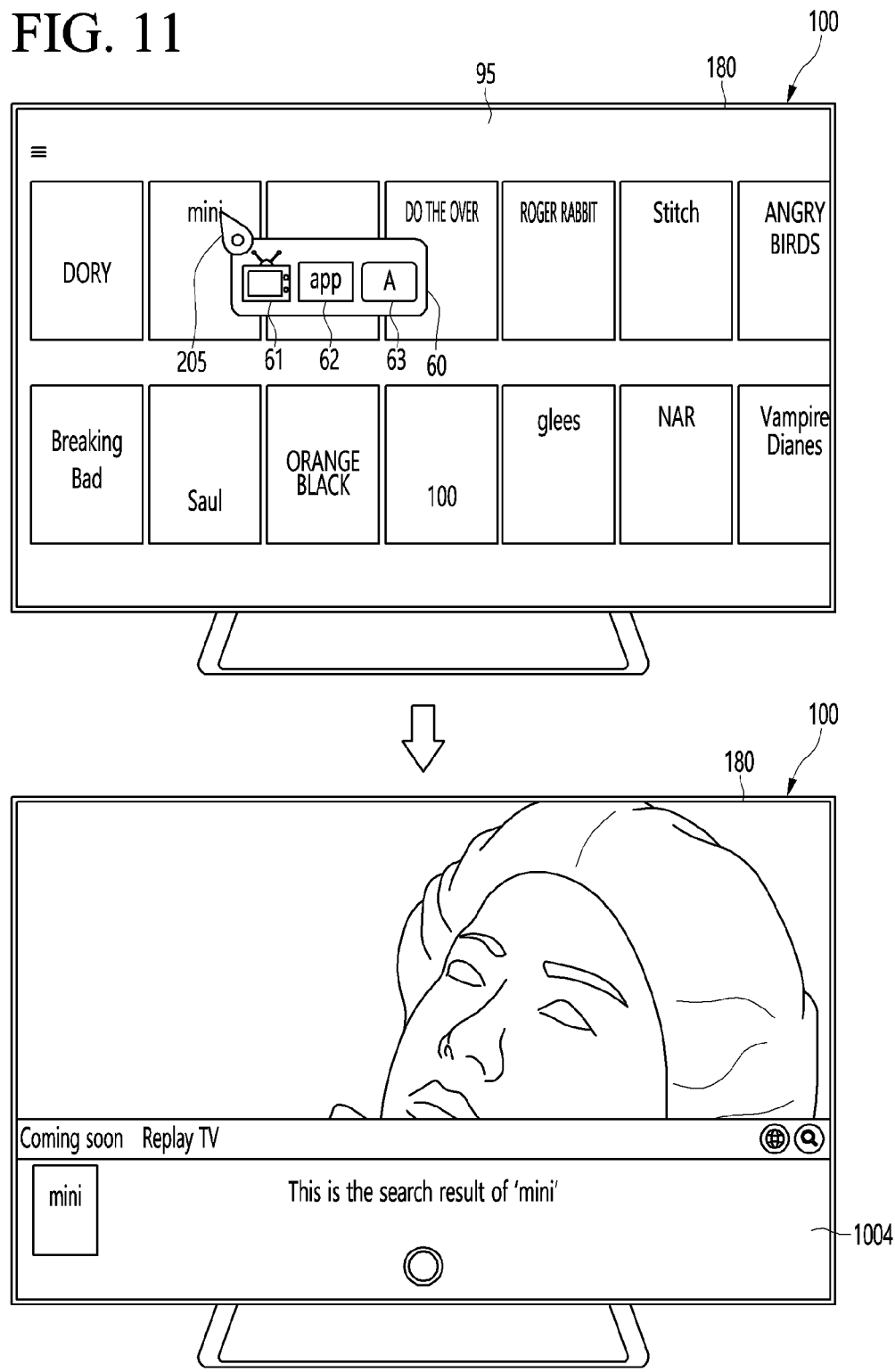
FIG. 11 is a view illustrating a method in which a display device receives a search command for a text in content and displays a search result according to a fourth embodiment of the present disclosure.

FIG. 11 is a view illustrating a method in which a display device receives a search command for a text in content and displays a search result according to a fourth embodiment of the present disclosure.

The display 180 may display the content 95, and the content 95 may be a mirroring image. In other words, the content 95 illustrated in FIG. 11 may be an image received from the external terminal. In this case, the controller 170 may receive a search command for a text displayed on the minoring image through the pointer 205.

Referring to an example of FIG. 11, the controller 170 may receive a search command for one area of the content 95 through the pointer 205. In this case, as the text in the area in which the pointer 205 is positioned is received from the external terminal, the text in the area in which the pointer 205 is positioned may be extracted, and a search operation may be performed using the extracted text.

Meanwhile, the controller 170 may extract a text related to an image, when an area in which the pointer 205 is positioned is the image. For example, the text related to the image may include a title, a main character, and an episode number. As illustrated in FIG. 11, the controller 170 may extract, as a search target text, the title of the image on which the pointer 205 is positioned, and may control the display 180 to display information 1004 resulting from the search using the extracted title FIG. 12 is a view illustrating a method in which a display device receives a search command for a text in content and displays a search result according to a fifth embodiment of the present disclosure.

The display 180 may display content 97, and the content 97 may be displayed while overlapping a specific area of a broadcasting image 96.

Figure 12:
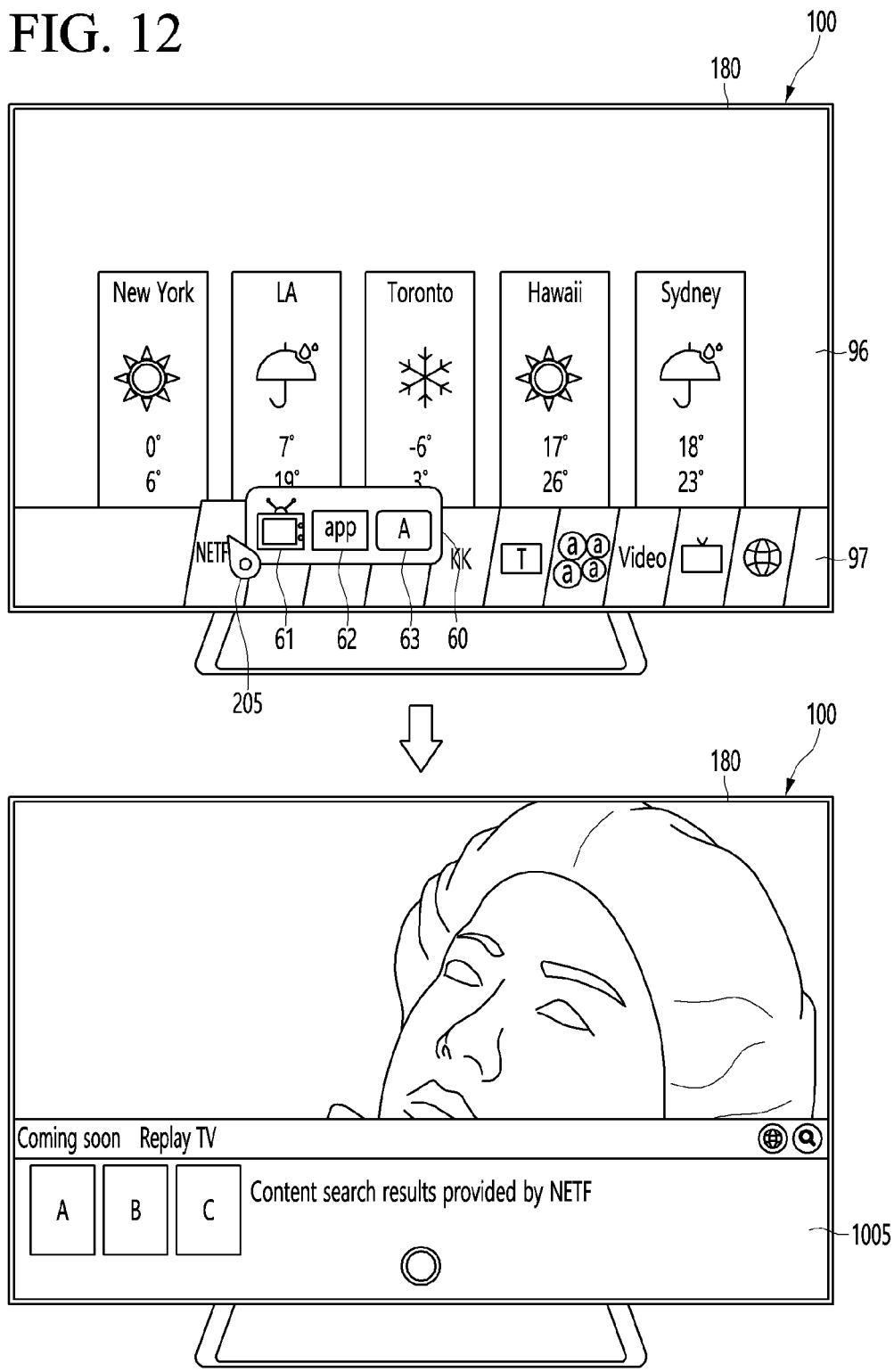
FIG. 12 is a view illustrating a method in which a display device receives a search command for a text in content and displays a search result according to a fifth embodiment of the present disclosure.

As illustrated in FIG. 12, the content 97 may be a home menu, as a home application is executed, but the present disclosure is not limited thereto. In other words, the content 97 may be information displayed as another application is executed instead of the home application.

The controller 170 may receive the search command for one area of the content 97 through the pointer 205. In this case, the pointer 205 may be positioned in a specific image area. The controller 170 may extract a text related to an image on an area in which the pointer 205 is positioned, when receiving a search command through the pointer 205 positioned in the image area. For example, the text related to the image may include a title, a main character, and an episode number of the image. The controller 170 may extract the text related to the image, based on the meta data of the image.

As illustrated in FIG. 12, the image in the area in which the pointer 205 is positioned is an image obtained by executing the moving picture service application. The controller 170 may extract, as a text, a title of the moving picture service application when receiving the search command through the pointer 205. In this case, the controller 170 may perform the search operation, based on the title of the moving picture service application, and may display information 1005 on a search result. In this case, the information 1005 on the search result may include contents provided by the moving picture service application.

Figure 13:
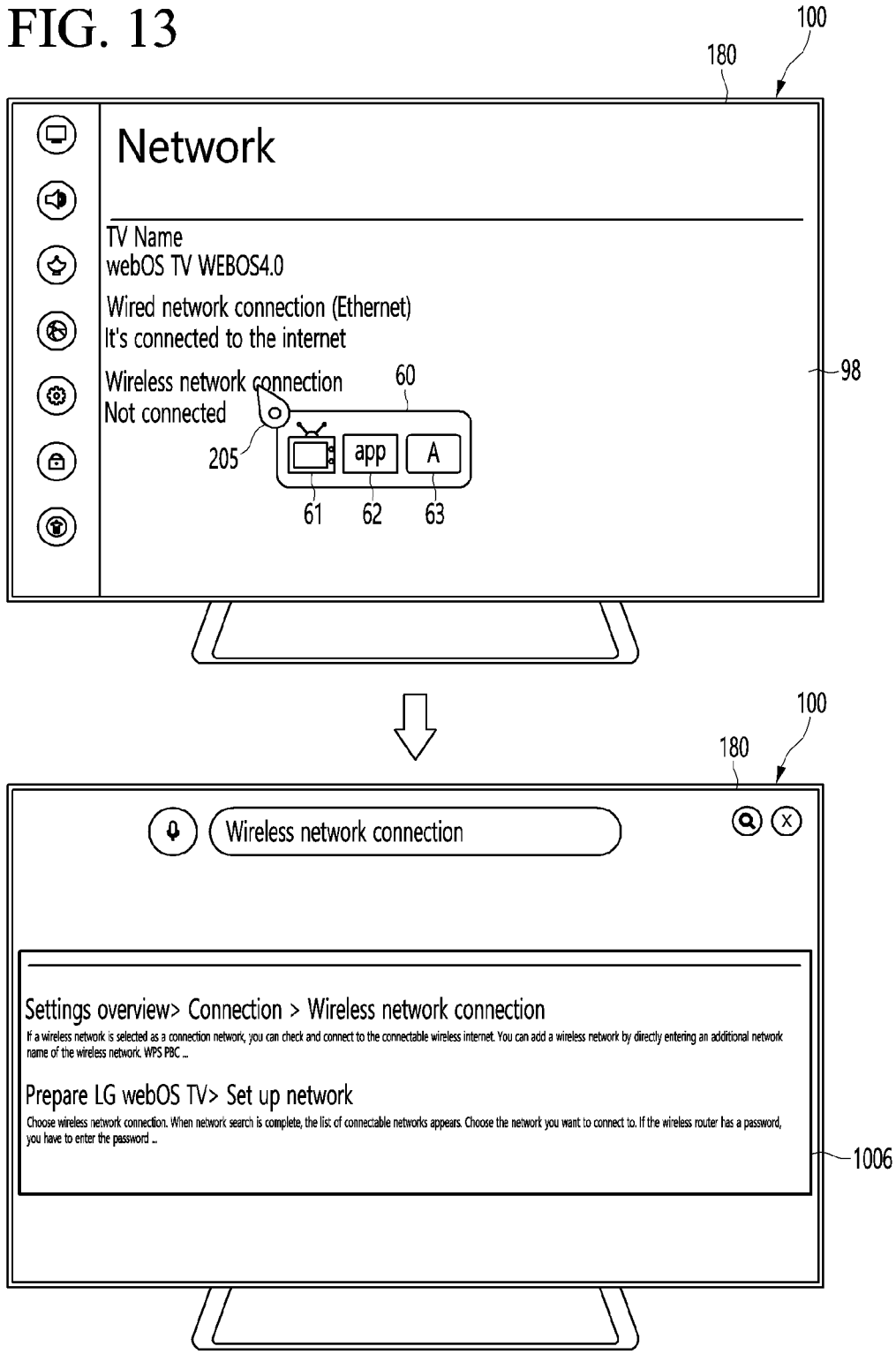
FIG. 13 is a view illustrating a method in which a display device receives a search command for a text in content and displays a search result according to a sixth embodiment of the present disclosure.

FIG. 13 is a view illustrating a method in which a display device receives a search command for a text in content and displays a search result according to a sixth embodiment of the present disclosure.

The display 180 may display content 98, and the content 98 may be a setting menu displayed, as the setting application is executed. However, this may be provided only for the illustrative purpose, and the content 98 may be information displayed, as another application is executed, instead of the setting application.

The controller 170 may receive the search command for one area of the content 98 through the pointer 205. In this case, a text displayed in the area, in which the pointer 205 is positioned, may be extracted. In this case, the text may include a fixed text or a variable text.

In this case, the fixed text may refer to a specific text regardless of the time elapsed or the state of the display device 100, and the variable text may refer to a text that may be changed depending on the time elapsed or the state of the display device 100. For example, referring to an example of FIG. 13, the text extracted from the area in which the pointer 205 is positioned may indicate the wording "a wireless network connected, not connected". In this case, the wording "a wireless network connected" may be the fixed text, and "~not connected" may be the variable text. In other words, the wording "—not connected" may be varied depending on the connection state with the wireless network.

In this case, the controller 170 may perform the search operation using only the fixed text of the extracted text. In other words, the controller 170 may acquire, as the search text, the fixed text of the extracted text.

Meanwhile, although the description of a method for setting the search range is omitted from the description made with reference to FIGS. 10 to 13, this is the same as the description made with reference to FIGS. 7 to 8.

Figure 14:
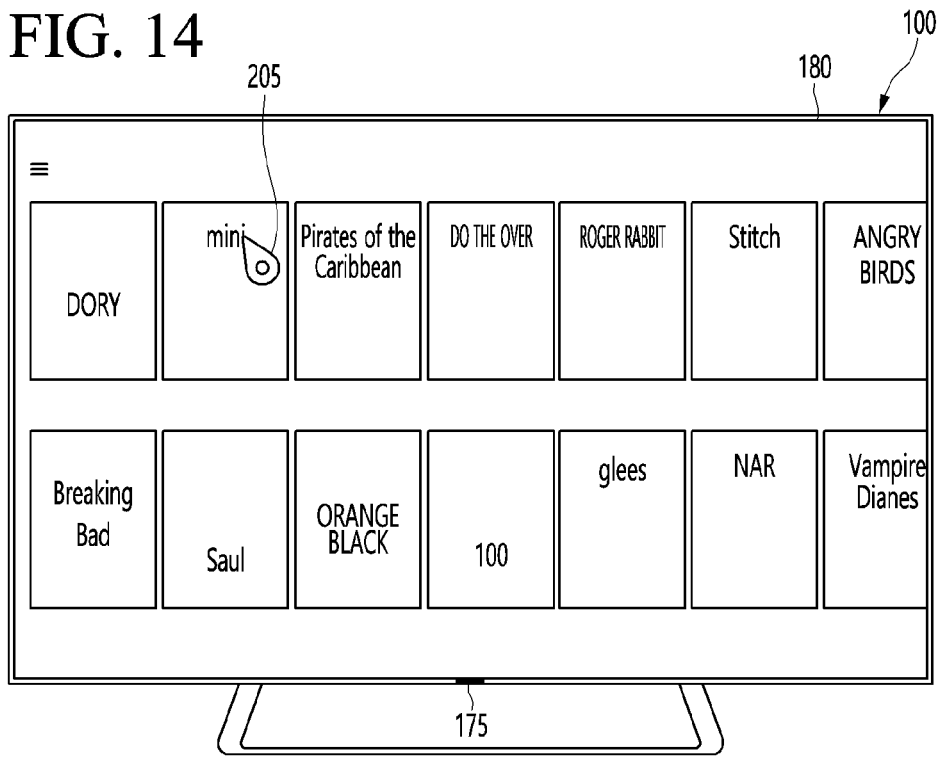
FIG. 14 is a view illustrating a method in which a display device receives a search command through a voice acquisition module according to an embodiment of the present disclosure.

FIG. 14 is a view illustrating a method in which a display device receives a search command through a voice acquisition module according to an embodiment of the present disclosure.

As illustrated in FIG. 14, the controller 170 may acquire a search command by recognizing a voice command through the voice acquisition module 175.

For example, the controller 170 may determine the search command as being received, when the wording "search" is included in the voice command received through the voice acquisition module 175. As illustrated in FIG. 14, the controller 170 may determine the search command as being received, when receiving a voice command, such as "search for this in the TV", "search for this in the app", or "search for this".

The voice command may include a search target or a search range. For example, the voice command may include the wording "search for this on the TV", "search for this on the app", or "search for this". In this case, the search target is "this", the search range may be "on the TV", or "on the app".

The controller 170 may acquire, as the search target, a text extracted from an area in which the pointer 205 is positioned, even when acquiring the search command through the voice command. In particular, the controller 170 may recognize, as the search target, the text extracted from the area in which the pointer 205 is positioned, when receiving "this" as the search target. As illustrated in FIG. 14, the controller 170 may acquire, as the search target, the text related to the image of the area in which the pointer 205 is positioned, when receiving the search command.

In addition, the controller 170 may extract the search range from the voice command. The controller 170 may search for a text, which corresponds to the search target, within the search range resulting from the voice command, when the voice command includes the search range (for example, "on the TV" or "in the app"). Unless the controller 170 extracts the search range from the voice command, the controller 170 may search for a text, which corresponds to the search target, by setting the entire portion of the voice command to the search range.

Figure 15:
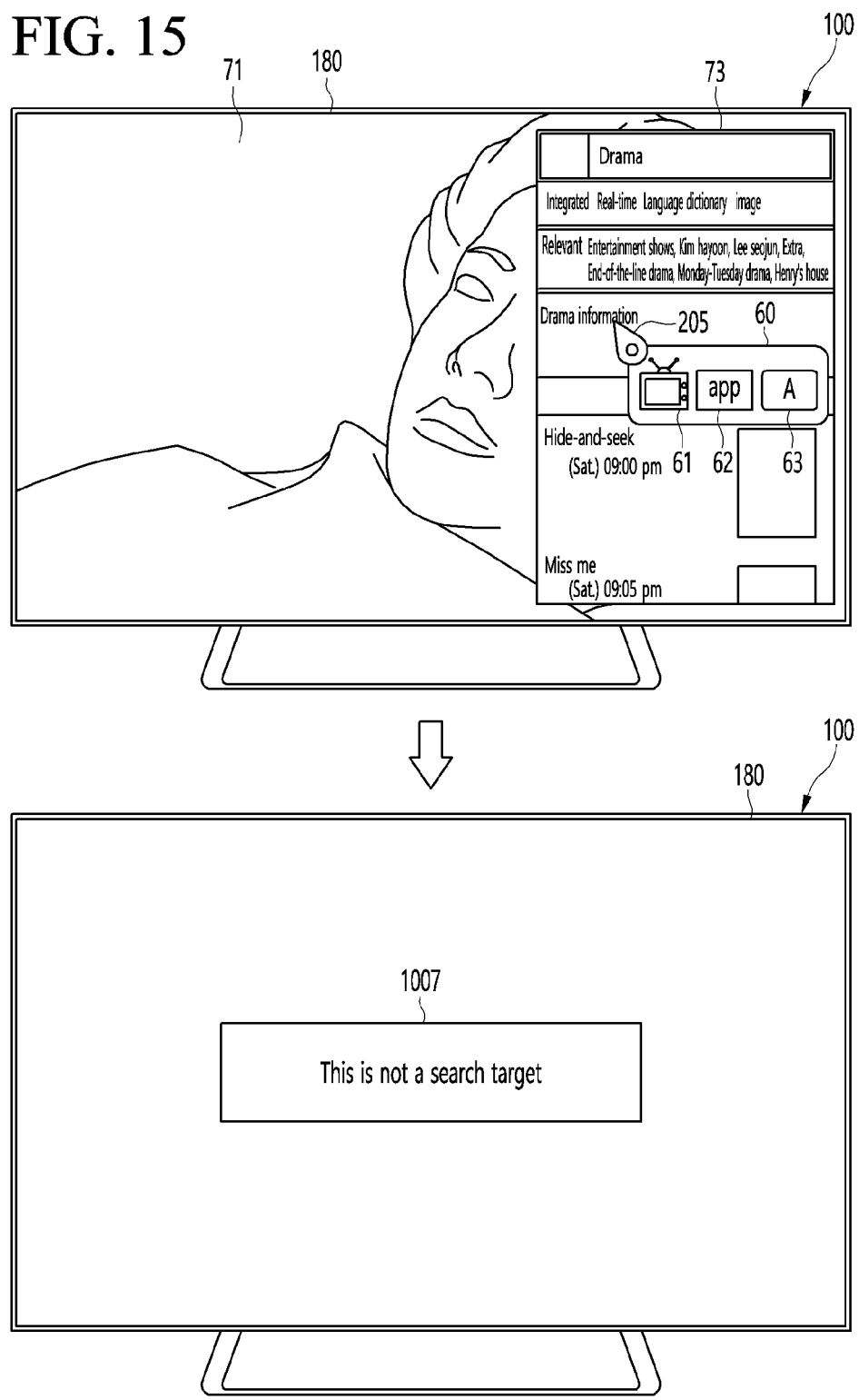
FIG. 15 is a view illustrating a method in which a display device displays a search impossibility informing message when failing to acquire a search target according to an embodiment of the present disclosure.

FIG. 15 is a view illustrating a method in which a display device displays a search impossibility informing message when failing to acquire a search target according to an embodiment of the present disclosure.

The controller 170 may determine whether an extracted text corresponds to the search target, after extracting the text related to an area in which the pointer 205 is positioned, and may perform a search operation only when the extracted text corresponds to the search target.

Meanwhile, the controller 170 may not perform the search operation, when the extracted text does not correspond to the search target. In this case, the controller 170 may control the display 180 to display a message 1007 for informing that search operation is impossible. In other words, the controller 170 may control the display 180 to display the message 1007 that a search operation is not performed, when the search operation is not performed even if a search command is received.

The message 1007 may indicate that the search operation is not performed. The message 1007 may further include a search impossibility cause. For example, as illustrated in FIG. 15, the message 1007 may include the search impossibility cause that the text selected by the pointer 205 does not correspond to the search target.

As described above, when the controller 170 controls the display 180 to display the message 1007, a user may easily recognize that the search operation is not performed, through the message 1007, thereby minimizing the case that the user erroneously recognizes the display device 100 as being faulted. In addition, when the message 1007 includes the search impossibility cause, and when the user requests for the search operation thereafter, the user may request for the search operation based on the message 1007 such that the search impossibility is not caused.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device for performing a search, the display device comprising:
    a display configured to display content;
    a user input interface configured to receive a control signal of a pointer displayed on the content; and
    a controller configured to:

determine a search target based on a text displayed in an area in which the pointer is positioned, control the display to display at least one search area icon for receiving selection for a search range after determining the search target, control the display to display a search result of the search target within the search range corresponding to the selected search area icon, and determine a text which has a hyperlink in the area in which the pointer is positioned as the search target.

2. The display device of claim 1, wherein the controller is configured to:

extract the text from the area in which the pointer is positioned; and determine the extracted text as the search target.

3. The display device of claim 1, wherein the controller is configured to, when the content is a web-browser:

determine the text, which is in the area in which the pointer is positioned, as a search target, when the text has a hyperlink; and control the display to display a search impossibility message, when the text, which is in the area in which the pointer is positioned, has no hyperlink.

4. The display device of claim 1, wherein the controller is configured to:

determine whether the text is the search target, based on a position of the text on the content.

5. The display device of claim 4, wherein the controller is configured to:

determine, as the search target, a text extracted from a title area of a banner, when the pointer positioned in the title area of the banner, when the content is the banner.

6. The display device of claim 1, wherein the controller is configured to:

determine whether the text in the area in which the pointer is positioned is the search target based on a size of the text.

7. The display device of claim 1, wherein the controller is configured to, when the content is a mirroring image:

receive, from an external terminal, a text in an area in which the pointer is positioned in the mirroring image; and determine the text received from the external terminal as the search target.

8. The display device of claim 1, wherein the controller is configured to, when the area, in which the pointer is positioned, is an image:

extract a text related to the image; and determine the extracted text as the search target.

9. The display device of claim 1, wherein the controller is configured to, when a fixed text and a variable text is included the area in which the pointer is positioned:

determine the fixed text as the search target.

10. The display device of claim 1, wherein the controller is configured to:

recognize a command for selecting one area within a predetermined time, which is on the content, through the pointer, as a command for selecting the text displayed in the area in which the pointer is positioned; and recognize the command for selecting the one area after a predetermined time, which is on the content, through the pointer, as a search command for searching for the text displayed in the area in which the pointer is positioned.

11. The display device of claim 1, further comprising:

a voice acquisition module to acquire a search command, wherein the controller is configured to:

acquire, as the search target, the text in the area in which the pointer is positioned, when receiving the search command through the voice acquisition module.

* * * * *